United States Patent
Liu et al.

(10) Patent No.: US 6,978,065 B2
(45) Date of Patent: Dec. 20, 2005

(54) RUGGEDIZED OPTICAL FIBER COLLIMATOR

(75) Inventors: Ying-Moh Liu, Saratoga, CA (US);
Cheng-Hsi Miao, San Jose, CA (US);
Yeou-Yen Cheng, Saratoga, CA (US)

(73) Assignee: OptiWorks, Inc., Fremont, CA (US)

( * ) Notice: Subject to any disclaimer, the term of this patent is extended or adjusted under 35 U.S.C. 154(b) by 168 days.

(21) Appl. No.: 10/391,861

(22) Filed: Mar. 18, 2003

(65) Prior Publication Data

US 2004/0184758 A1 Sep. 23, 2004

Related U.S. Application Data

(60) Provisional application No. 60/365,877, filed on Mar. 19, 2002.

(51) Int. Cl.[7] .................................................. G02B 6/32
(52) U.S. Cl. ........................ 385/33; 385/15; 385/31
(58) Field of Search ............................. 385/31, 33, 34, 385/47, 48, 60, 61, 78, 79, 15

(56) References Cited

U.S. PATENT DOCUMENTS

| 5,212,745 | A  | * | 5/1993  | Miller    | 385/25 |
| 5,359,683 | A  |   | 10/1994 | Pan       |        |
| 6,546,169 | B1 | * | 4/2003  | Lin et al.| 385/39 |
| 6,714,703 | B2 | * | 3/2004  | Lee et al.| 385/34 |

* cited by examiner

Primary Examiner—Jennifer Doan
(74) Attorney, Agent, or Firm—Billy Lau

(57) ABSTRACT

The present invention relates to a ruggedized optical fiber collimator. An embodiment of the present invention includes a housing, an optical fiber, a collimating lens system comprising at least one lens, and an inner tube. The optical fiber extends into the housing through the inner tube. The housing houses the inner tube and the collimating lens system. The optical fiber terminates in the housing. The housing, the optical fiber, the collimating lens system and the inner tube are arranged to perform the function of an optical fiber collimator. The inner tube is made from an optical fiber compatible material. Examples of the optical fiber compatible material include ruby, quartz, and sapphire.

2 Claims, 2 Drawing Sheets

RUGGEDIZED OPTICAL FIBER COLLIMATOR

CROSS-REFERENCE TO RELATED APPLICATIONS

This application claims the benefit of Provisional Patent Application Ser. No. 60/365,877 filed Mar. 19, 2002, which is incorporated by reference herein.

FIELD OF THE INVENTION

This invention generally relates to optical fiber technology. Particularly, this invention relates to an improved ruggedized optical fiber collimator for an optical fiber.

BACKGROUND OF THE INVENTION

Optical fiber technology is widely applied in communication, including telecommunication, data communication, cable television, and fiber-to-home applications. Optical fiber systems for some applications, including telecommunications and data communications, require high reliability and tolerance to harsh environments. The optical fiber collimator is a key component in an optical fiber system. It optically couples an optical fiber to an optical component. Optical fiber systems, in particular, optical fiber communication systems, employ a large quantity of optical fiber collimators because most optical fibers employed in these systems are terminated with optical fiber collimators. To improve reliability and tolerance to harsh environments, high reliability optical fiber systems employ ruggedized components, including ruggedized optical fiber collimators.

There are numerous prior art optical fiber collimator designs. In the past, the most important design goal for passive optical components was optimal optical transmission performance because the laser signal sources employed in an optical fiber communication system were expensive and not as reliable when compared to the passive components in the system, including optical fiber collimators. By optimizing the transmission performance of passive optical components in an optical communication system, the lowest power and therefore the least expensive and more reliable laser signal source can be employed in the system. FIGS. 1 and 2 illustrate representative prior art optical fiber collimator designs. Many of these prior art designs are optimized for optical transmission performance.

FIG. 1 shows a prior art optical fiber collimator design. Optical fiber 107 attaches to fiber ferrule 1. Fiber ferrule 1 and collimating lens 109 attach to housing 101. Housing 101 provides mechanical support to fiber ferrule 1 and collimating lens 109. In the fabrication process of this optical fiber collimator, optical fiber 107 is inserted into fiber ferrule 1 and secured to fiber ferrule 1. The end of optical fiber 107 and the end of fiber ferrule 1 are then polished to form optical fiber termination 108. To reduce reflection and improve optical transmission performance, the surface of optical fiber termination 108 is typically polished at an angle to the surface that is perpendicular to the axis of the fiber ferrule. The axis of the fiber ferrule is essentially the same as the optical axis of optical fiber 107 at optical fiber termination 108. Collimating lens 109 is placed at a distance from fiber termination 108. Similar to the surface at optical fiber termination 108, the surface of collimating lens 109 that is facing optical fiber termination 108 is polished at an angle to the surface that is perpendicular to the optical axis of collimating lens 109. This angle is introduced to the lens design to reduce reflection and to match the corresponding angle of optical fiber 107 at optical fiber termination 108. Fiber ferrule 1 and collimating lens 109 are then installed into housing 101. Although it is not necessary, either fiber ferrule or collimating lens 109 is secured to housing 101 to facilitate the alignment process. After that, the distance between optical fiber termination 108 and collimating lens 109 is adjusted, and either collimating lens 109 or fiber ferrule 1 is rotated about its optical axis for optimal optical transmission performance. After the alignment process, both fiber ferrule 1 and collimating lens 109 are secured to housing 101. Conventional fiber ferrule 1 is typically made from a capillary tube. One skilled in the art readily understands that there are numerous types of collimating lens or collimating lens system designs, optical fiber termination and termination methods, housing designs, and fiber ferrule designs commonly employed in optical fiber collimators.

FIG. 2 shows another prior art design. It is a variation of the design shown in FIG. 1. Compared to the design shown in FIG. 1, the design shown in FIG. 2 has a multi-piece housing that includes first housing 3 and second housing 4. Referring to FIG. 2, optical fiber 107 attaches to fiber ferrule 1 and collimating lens 109 attaches to second housing 4. Fiber ferrule 1 and second housing 4 attaches to first housing 3. Second housing 4 allows for the adjustment of the relative offset between the optical axes of optical fiber 107 at optical fiber termination 108 and collimating lens 109 to achieve the desirable optical transmission performance. As in the design shown in FIG. 1, conventional fiber ferrule 1 is typically made from a capillary tube. The material compatibility of capillary tube and optical fiber, however, limits the tolerance to harsh environments for these prior art designs.

In the past, laser sources were a primary limiting factor to optical fiber system reliability. With the advent of low cost high reliability laser sources for optical fiber systems, some of the passive components in an optical fiber system become primary limiting factors to system reliability. It is desirable to improve the reliability and ruggedness of passive components, including the optical fiber collimator, to improved system reliability. It is therefore an objective of this invention to provide a ruggedized optical fiber collimator.

SUMMARY OF THE INVENTION

According to this invention, an embodiment of the present invention includes a housing, an optical fiber, a collimating lens system comprising at least one lens, and an inner tube. The optical fiber extends into the housing through the inner tube. The housing houses the inner tube and the collimating lens system. The optical fiber terminates in the housing. The collimating lens system optically couples to the optical fiber through the optical fiber termination. The housing, the optical fiber, the collimating lens system and the inner tube are arranged to perform the function of an optical fiber collimator. The inner tube is made from an optical fiber compatible material. Examples of the optical fiber compatible materials include ruby, quartz, and sapphire.

DESCRIPTION OF THE DRAWINGS

A better understanding of the invention may be gained from the consideration of the following detailed description taken in conjunction with the accompanying drawings in which.

DETAILED DESCRIPTION OF THE INVENTION

Figure 1:
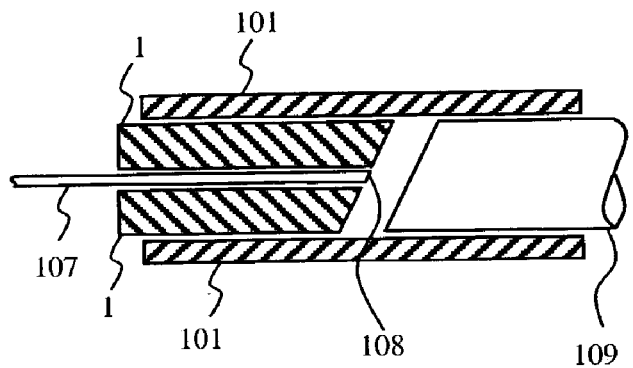
FIG. 1 shows the configuration of a conventional optical fiber collimator.

In the description that follows, like parts are indicated throughout the specification and drawings with the same reference numerals. The present invention is not limited to the specific embodiments illustrated herein.

Figure 3:
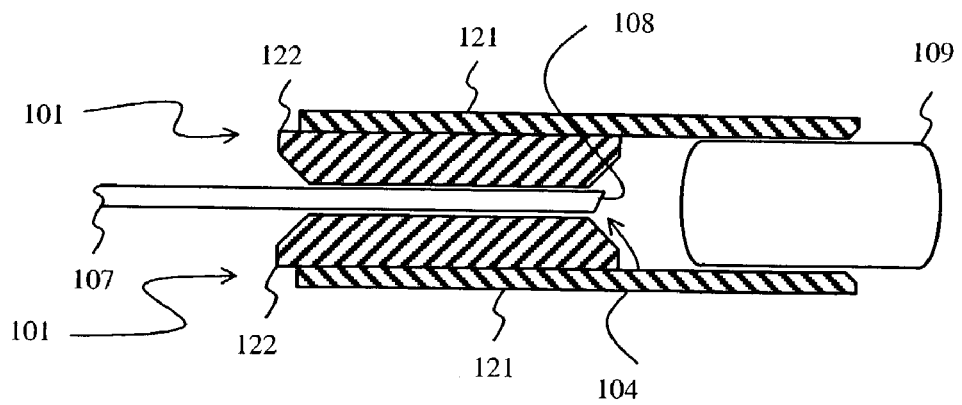
FIG. 3 shows the configuration of an embodiment of the present invention.
Figure 4:
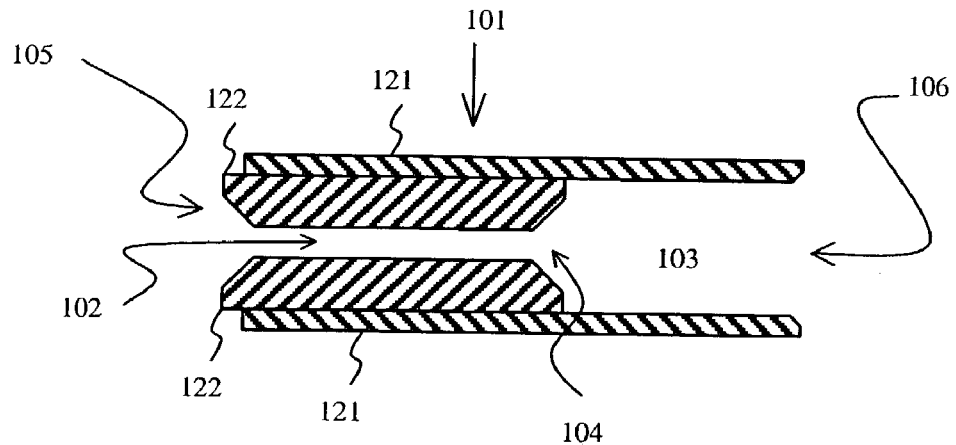
FIG. 4 is a sectional view of a representative housing of the embodiment shown in FIG. 3.

FIG. 3 shows the configuration of an embodiment of the present invention and FIG. 4 shows a sectional view of a representative housing of this embodiment. Referring to FIG. 4, housing 101 includes an outer tube 121 and inner tube 122. Inner tube 122 has first channel 102. Outer tube 121 has second channel 103. First channel 102 and second channel 103 are generally rod-shaped and share a common axis. Inner tube 122 occupies a portion of second channel 103. Because first channel 102 and second channel 103 may have different diameters, there is optional transition region 104 between first channel 102 and second channel 103. Entrance to first channel 105 and entrance to second channel 106 are tapered. Housing 101 provides structural support to the embodiment. Inner tube 122 is made from an optical fiber compatible material, including ruby, quartz, and sapphire. The optical fiber compatible material can be precision-laser-drilled and relatively easily polished. Inner tube 122 is permanently bonded to outer tube 121 and it is permanent part of housing 101.

Figure 2:
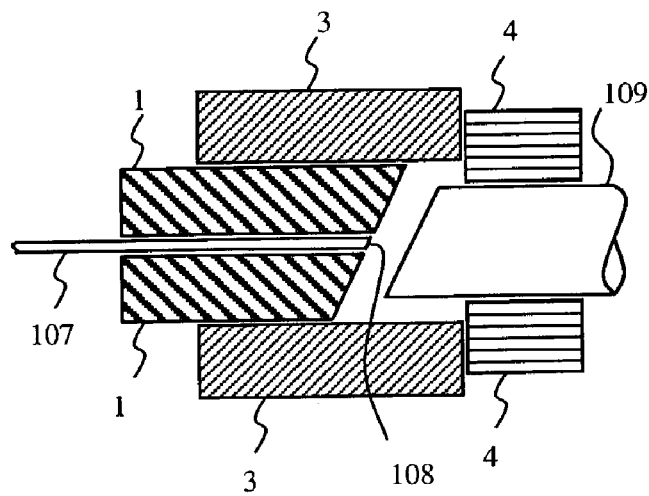
FIG. 2 shows the configuration of another conventional optical fiber collimator.

Referring to FIGS. 3 and 4, the end portion of optical fiber 107 is located in first channel 102 of housing 101. The inner diameter of first channel 102 is larger than the outer diameter of optical fiber 107. Therefore, optical fiber 107 may slide inside first channel 102. At the end of optical fiber 107 is optical fiber termination 108. Optical fiber termination 108 is typically formed by cleaving optical fiber 107. The surface at optical fiber termination 108 is at an angle to the plane that is perpendicular to the optical axis of the end option of optical fiber 107. The angle may be zero degree. Nevertheless, one skilled in the art readily understands that by keeping this angle to be positive and small, typically between one degree and ten degrees, will help to reduce transmission loss and reflection of the embodiment. When the end portion of optical fiber 107 is installed in first channel 102 as shown in FIG. 3, the optical axis of the end portion of optical fiber 107 is the same as the axis of first channel 102. To further reduce transmission loss and reflection, optical fiber termination 108 has an optional anti-reflection coating. The conventional fiber ferrule 1 shown in FIGS. 1 and 2 is eliminated in this invention and replaced by inner tube 122 that is made from an optical fiber compatible material. The cross section of collimating lens 109 on the plane that is perpendicular to the optical axis of collimating lens 109 has the shape of a circle. The diameter of this circle is the outer diameter of the body of collimating lens 109. At least a portion of collimating lens 109 is located in second channel 103. The inner diameter of second channel 103 is larger than the outer diameter of the body of collimating lens 109. Therefore collimating lens 109 may slide inside second channel 103. The surface of collimating lens 109 may have an anti-reflection coating to maximize optical transmission and minimize reflection.

Figure 5:
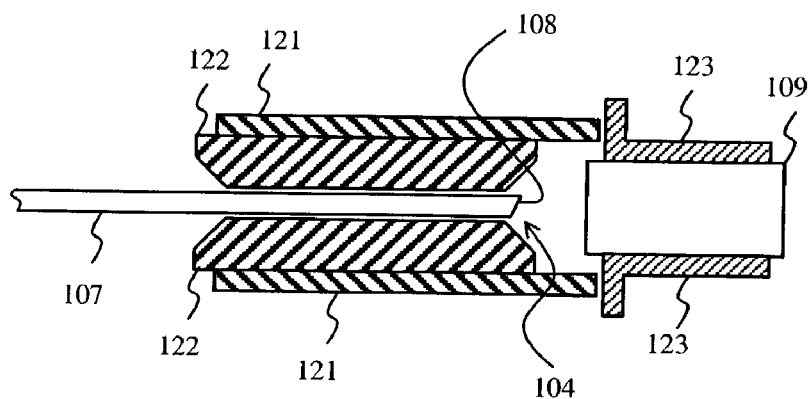
FIG. 5 shows the configuration of an alternative embodiment of the present invention.

FIG. 5 illustrates an alternative embodiment of this invention. Compared to the embodiment shown in FIG. 3, a gradient index (GRIN) lens is used instead of a spherical lens for collimating lens 109 and the housing employed in this embodiment is a multi-piece housing. The two-piece housing includes first housing and second housing 123. First housing comprises outer tube 121 with inner tube 122 permanently attached to it. Second housing holds collimating lens 109. With the multi-piece housing shown FIG. 5, the offset between the optical axis of collimating lens 109 and the optical axis of optical fiber 107 at optical fiber termination 108 can be adjusted during the alignment process. Second housing 123 is usually secured to first housing after the alignment process. Compared to the prior art designs, the alternative embodiment does not have a conventional fiber ferrule.

There are numerous variations to the embodiments above trivial to the one skilled in the art. Examples of these variations include but are not limited to:

the cross section of the channel along the axis of first channel 102 is not circular-shaped, common alternatives include polygon-shaped, star shaped, or irregular-shaped;

the cross section of the channel along the axis of first channel 102 is not uniform, common alternatives include tapered or irregular;

the cross section of the channel along the axis of second channel 103 is not circular-shaped, common alternatives include polygon-shaped, star shaped, or irregular-shaped;

the cross section of the channel along the axis of second channel 103 is not uniform, common alternatives include tapered or irregular;

the entrance to first channel 105 may be tapered or not tapered;

the entrance to second channel 106 may be tapered or not tapered;

other types of collimating lenses such as an aspheric lens or an asymmetrical lens are employed as the collimating lens;

the single collimating lens is replaced by a lens system that includes one or more lens elements;

the lens system has its own supporting structure;

the cross section of collimating lens 109 on the plane that is perpendicular to the optical axis of collimating lens 109 has a shape other than that of a circle;

the collimating lens has shape other than the rod shape illustrated, such as a Boolean composite comprised of a hemisphere and a right cone connected and aligned at their planer surfaces;

the alignment of the embodiment includes adjustment other than the distance between optical fiber termination 108 and the collimating lens 109, such as the relative angular orientation about their optical axes; and optical fiber 107 or collimating lens 109 is attached to housing 101 through mechanical methods.

Further, one skilled in the art readily understands that any optical fiber collimator design that employs a conventional fiber ferrule, including the ones illustrated in FIGS. 1 and 2, can be ruggedized by replacing the conventional fiber ferrule with an inner tube that is made from an optical fiber compatible material according to this invention. The shape of the inner tube may be identical to the shape the conventional fiber ferrule.

Although the embodiment of the invention has been illustrated and that the form has been described, it is readily apparent to those skilled in the art that various modifications may be made therein without departing from the spirit of the invention.

What is claimed is:

1. An optical fiber collimator, comprising:
a housing having a first channel and a second channel, said first channel being coupled to said second channel;
an optical fiber having an optical fiber termination, a portion of said optical fiber being in said first channel and said optical fiber termination being in said housing; and
a collimating lens system disposed in said second channel being optically coupled to said optical fiber through said optical fiber termination;
wherein,
said housing, comprising:
an outer tube; and
an inner tube disposed at least partially in said outer tube, the channel in said inner tube being said first channel, and said inner tube is made substantially from an optical fiber compatible material selected from the group consisting of ruby, quartz, and sapphire;
said housing is a multi-piece housing; and
said housing allows an adjustment of a relative offset between the optical axis of said collimating lens and an optical axis of said optical fiber at said optical fiber termination.

2. An optical fiber collimator, comprising:
a housing having an inner tube that is made substantially from an optical fiber compatible material selected from the group consisting of ruby, quartz, and sapphire;
an optical fiber extending into said housing through said inner tube having an optical fiber termination in said housing; and
a collimating lens system disposed at least partially in said housing being in optical communication with said optical fiber through said optical fiber termination;
wherein:
said housing is a multi-piece housing; and
said housing allows for an adjustment of a relative offset between an optical axis of said collimating lens and the optical axis of said optical fiber at said optical fiber termination.

* * * * *